United States Patent [19]
Selker

[11] Patent Number: 5,736,974
[45] Date of Patent: *Apr. 7, 1998

[54] METHOD AND APPARATUS FOR IMPROVING VISIBILITY AND SELECTABILITY OF ICONS

[75] Inventor: Edwin Joseph Selker, Palo Alto, Calif.

[73] Assignee: International Business Machines Corporation, Armonk, N.Y.

[*] Notice: The term of this patent shall not extend beyond the expiration date of Pat. No. 5,565,888.

[21] Appl. No.: 625,829

[22] Filed: Apr. 1, 1996

Related U.S. Application Data

[63] Continuation of Ser. No. 390,323, Feb. 17, 1995, Pat. No. 5,565,888.
[51] Int. Cl.⁶ .................................................. G09G 5/08
[52] U.S. Cl. ........................ 345/146; 345/145; 345/157
[58] Field of Search ............................ 345/157, 156, 345/163, 168, 173, 158, 162, 145, 146, 127, 128, 129, 130, 131; 395/348, 352, 353, 354, 358

[56] References Cited

U.S. PATENT DOCUMENTS

| | | | |
|---|---|---|---|
| 4,698,625 | 10/1987 | McCaskill et al. | 345/157 |
| 4,931,783 | 6/1990 | Atkinson | 345/146 |
| 5,119,079 | 6/1992 | Hube et al. | 345/173 |

*Primary Examiner*—Xiao Wu
*Attorney, Agent, or Firm*—Whitham, Curtis, Whitham & McGinn; Stephen C. Kaufman

[57] ABSTRACT

Enhanced visibility of icons and other types of menu items is provided by increasing size and or skew or both of one or more icons or menu items in a generally inverse relation to proximity of a cursor image address to particular icons or menu items. Increase of size enhances user recognition of an ordinarily small menu item or icon and simultaneously provides the effect of stabilizing cursor position during selection without affecting linearity of response to a graphic input device. Skew and repeated expansion may be used to attract user attention while repeated expansion simplifies icon manipulation by the user in determining a response to a mandatory input demand from an application.

17 Claims, 3 Drawing Sheets

METHOD AND APPARATUS FOR IMPROVING VISIBILITY AND SELECTABILITY OF ICONS

This application is a continuing application of application Ser. No. 08/390,323, filed Feb. 17, 1995, now U.S. Pat. No. 5,565,888.

BACKGROUND OF THE INVENTION

1. Field of the Invention

The present invention generally relates to manipulation and selection of menu entries and icons using interactive manipulation of graphics images and, more particularly, to arrangements providing increased visibility and ease of selection of icons and menu entries without compromising cursor response.

2. Description of the Prior Art

In the field of computers and data processors, it has long been recognized that the capability of a user to receive and assimilate information in order to interact easily with the computer is of major importance in the usefulness of the computer in many applications. The utility of increased "computing power" to execute programs at ever increasing speeds diminishes in all but a relatively few highly complex programs which require only slight interactivity with a user when the user cannot readily perceive, understand and react to the results thereof. Therefore, the interest in and dedication of a significant fraction of available computing power to the user interface has become a widely accepted practice for both hardware and software design in the data processing field. In recent years, it has also been found that displayed graphics images, especially if manipulable by the user provide a particularly good medium for both the communication of information to the user including processor and program execution status and for the input of user control information and data, particularly users suffering disabilities or handicaps. Arrangements utilizing various techniques to provide bi-directional communication between processor and user through display manipulation are often collectively referred to as graphical user interfaces.

Input of control signals and data through the medium of a graphic display requires the use of a device by which a location on the display may be specified, together with a mechanism for selection of that location in order to select an object, such as an icon or displayed data, associated with that location. This requirement, in turn, requires some arrangement to provide visual feedback to the user, commonly by display of a cursor, pointer or the like so that the operator can control the specification of a location without inputting of data or exercising control until the location is correctly specified.

Increased interactivity of the user and data processor also increases the number of control and/or data options which must be displayed to the operator at any given time. In the past, large numbers of control options were grouped by category and the categories listed as a menu of only one or a few text lines on the screen; individual options being found by accessing an individual item in that menu to access one or more further menus, generally arranged in a hierarchical fashion, to find the desired option. A particularly successful form of this arrangement is generally referred to as a pull-down menu. Nevertheless, such a hierarchical selection process consumes substantial user and processor time and assumes that the operator is highly familiar with the application program in order to accurately select a category in which a desired option is to be found without laborious searching or browsing through successive menus.

Presently, it is considered desirable to provide as many options as possible on a single menu displayed on the display screen in order to more fully inform the operator of the options available for control and to avoid the multiple selections required for operation of successive hierarchical pull-down menus. At the same time, however, an increased number of selectable options presented on the display screen consume a substantial portion of the screen display space and would interfere with display of, for example, a document unless the area allocated to each selectable item is limited; implying small displayed size of the menu item or icon. Such area limitation is facilitated by use of graphical legends, generally referred to as icons, which use standard images rendered on small standardized areas rather than alphanumeric legends which may require variable size fields. However, the small size of icons when many options are available increases the accuracy with which a location must be specified for correct selection as well as reducing visibility to the operator and the difficulty of maintaining the cursor at that location during selection.

While some advances in improving immunity to modification of specified position during selection has been achieved, such as in copending U.S. patent application Ser. No. 08/340,935, filed Nov. 17, 1994, the only improvement toward ease of operator selection with a cursor has been in the provision of a so-called gravity well around each selectable icon or menu item. (An icon is a special case of a menu item only to the extent that a graphic image may be implied. As used hereinafter, the term "icon" is to be understood to be generic to any form of menu item.) Little, if any development has been directed to improvement of icon visibility or to aid recognition by a user.

The "gravity well" approach comprises the provision of position comparison between an icon location and cursor position to provide cursor stability at a selection point within the icon and to provide a degree of "attraction" of the cursor to the nearest icon or menu selection, usually by weighting increments of cursor movement specified by the operator to develop a preferential direction of cursor movement toward the nearest menu item. Unfortunately, while such an arrangement reduces positional errors during selection, linearity of cursor response is inherently compromised by the implementation of such an arrangement. For example, if a plurality of icons or menu selections are placed adjacent to each other, a substantial amount of actuation of a graphic input device may be necessary to move a cursor away from a selection position of enhanced stability due to the gravity well. Therefore, if a cursor is positioned on an icon, the amount of movement of a graphical input device necessary to move the cursor away from that icon toward the desired icon may cause overshoot of the desired icon to another icon which the operator does not wish to select. Correction then becomes equally difficult since the cursor again becomes trapped in the gravity well of another undesired icon.

Additionally, when a large number of icons are presented on an acceptably small portion of the screen area, visibility of the individual icons and the ability of the user to recognize the identity of individual icons is severely compromised. This is especially true where overall available display area or resolution is limited such as in portable and notebook computers, many of which have adequate processing power to support multitasking which is preferably implemented with display of plural overlaid windows, each window necessarily being of smaller size than the screen. The use of such windows further reduces the display area available to a particular application since the edges of overlaid windows must also be displayed to the operator to indicate processor and application status.

Additionally, many applications contain procedures and sub-routines which require user intervention; either of a mandatory nature (e.g. requiring an acknowledgement or confirmation of a command, input of a print command or a correction of input data) or selection between a limited subset of menu items. In some applications, the user is informed of the requirement for user intervention by the automatic display of a so-called text balloon, help window or special purpose menu. However, such procedures or routines may be entered unexpectedly and these types of display images require substantial display area and may obscure the portion of the display screen which the user needs to see in order to make the required decision and appropriate input to the system.

As an alternative which avoids such consumption of display area, it is also known in such instances to call the operator's attention to particular menu choices or mandatory required inputs by altering the visual attributes of icons or menu items, such as by blinking, change of color or increasing display brightness or intensity of particular displayed items. However, when the icon or menu item is already displayed at small size, change of display attributes does not enhance and generally degrades recognition of icon or menu item identity by a user. Further, blinking or intensity change of a very small area of the display is often not immediately evident to a user and does not immediately convey the need for an input or selection. This latter problem is particularly characteristic of some display media, such as liquid crystal displays in which the gamut of available visual image values is limited in intensity range. In any case, the alteration of visual attributes of a menu item such as an icon is necessarily displayed in an area which is displaced from the location on the display where current input data is displayed and the change of visual attributes must, at best, be detected by the peripheral vision of the user.

Accordingly, it is seen that currently known display enhancement techniques are not well-suited to a very large number of commonly encountered conditions where communication between a user and data processing system are required. While some attempts have been made to automatically evaluate the display and to modify the display enhancement, such as providing for variable location of help windows or switching between display enhancement modes, none have been fully successful in resolving trade-offs between required screen area and low visibility and/or user recognition in order to significantly improve the efficiency of communication through the graphic user interface.

All of the above problems are increased in severity for users of data processing equipment who may have some degree of visual impairment. In particular, the number of users of computers, particularly of the portable or notebook type who are of an age at which some loss of focal accommodation is to be expected has greatly increased in recent years. Therefore, when the displayed size of icons or menu items is reduced, particularly at a fixed display resolution, recognition of the identity of icons and menu items becomes particularly difficult and slow for such users. While some arrangements have been proposed to display images at increased size, such as fractional windows which cover less than the full page size or width of a document, no arrangements are known for enhancement of menus as a visual aid for such users. Further, fractional windows are not generally satisfactory due to the changes (usually abrupt shifts) of position of the document under the fractional window and general functional incompatibility with the goals answered by overlaid windows in multi-tasking environments, as discussed above.

SUMMARY OF THE INVENTION

It is therefore an object of the present invention to provide a display enhancement which minimizes required display area but improves the ability of a user to recognize icons and menu items.

It is another object of the present invention to provide an enhancement to a graphic user interface which reduces the accuracy with which a cursor must be positioned on a display for menu item selection, particularly using icons, which does not require interference with cursor manipulation.

It is a further object of the present invention to provide a graphic user interface enhancement which improves visibility and communication of mandatory user action and particular groups of available options in applications.

It is yet another object of the present invention to provide an automatically operable visual aid for enhancement of icon visibility and recognition in a graphic user interface.

In order to accomplish these and other objects of the invention, a method for visually enhancing a display of menu items is provided including the steps of establishing a location of at least one menu item on a display, establishing a location of a cursor image on a display, determining proximity between locations of menu items and the location of the cursor image, and displaying a menu item in accordance with an attribute determined in generally inverse relation to the proximity of the cursor and the menu item.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
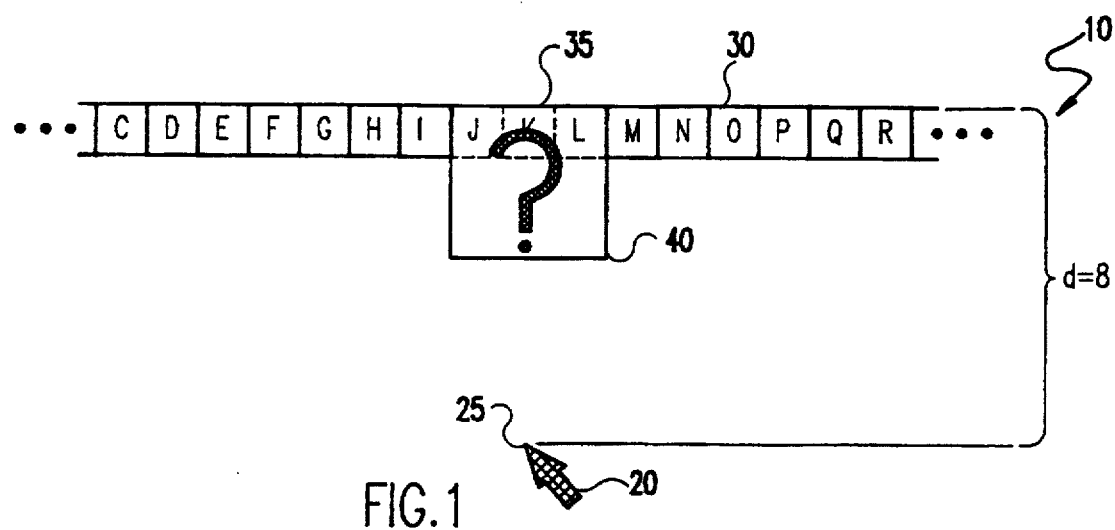
FIGS. 1, 2, 3A and 3B are a sequence of displays of an iconic menu produced in accordance with the invention.

Referring now to the drawings, and more particularly to FIGS. 1–3B, there is shown an exemplary sequence of displays produced is accordance with the invention. It is to be understood that this sequence is merely exemplary and intended to enhance understanding of the intended function of the invention in regard to attainment of the above-noted objects and the attendant advantages thereof. Other types and arrangements of the display are certainly possible and will be evident to those skilled in the art in view of the description of the invention which follows.

Specifically in the example shown by FIGS. 1–3A, a portion 10 of a display includes an icon menu 30 which is assumed, for simplicity of explanation, to be positioned at the top of a display screen or window thereon. A graphic cursor 20 (as opposed to a text cursor, although a text cursor may be used in the practice of the invention) is also provided on the display and is assumed to be fully manipulable by a graphic input device such as a mouse or, preferably, an isometric joystick such as that described in the above-noted copending application. In most applications, it is provided that the graphic cursor is hidden upon actuation of a key of a keyboard or other data input and reappears upon a subsequent manipulation of the graphic input device, after a lapse of a time period, etc. The graphic cursor is therefore assumed to be active and visible in this explanation of the operation of the invention.

It is also assumed for simplicity of explanation that the space allocated to each icon is approximately two character spaces although the articulation of the display and the icon menu is not critical to the practice of the invention. In any event, an address or location of the center or boundaries of each icon is known and either address (or any other address but preferably within the boundary of each icon) can be used in the practice of the invention. Likewise, in known systems for manipulation of a graphic cursor, a reference address or location around which the graphic cursor image 40 is rendered will also be known.

Figure 6:
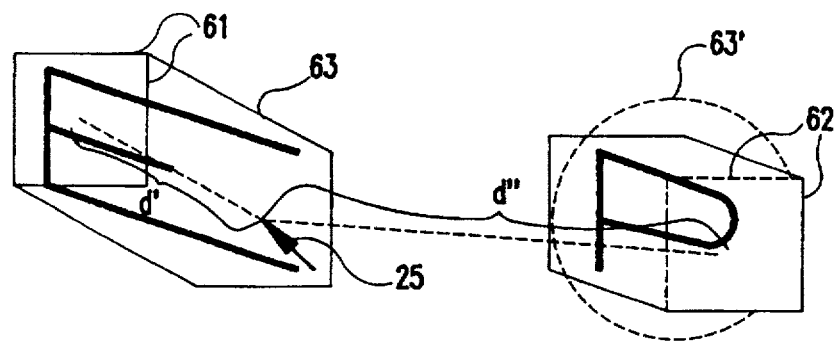
FIG. 6 is a depiction of a further variation of the display for enhancing attraction of the user's attention.

Accordingly, a distance d can be readily computed from some address within the icon menu 30. (In this simplified case, the distance is considered in only the vertical direction from the top of the display or window to the selection point location 25 on the cursor 20. However, in point of fact, in any situation or application in which the icons or menu items are aligned in a row or column, it is only necessary to perform an evaluation of d in a single coordinate direction.) It is desirable that the display of the icon menu be unaffected for cursor image positions over most of the display area or window. Therefore, some specific or inherent threshold of proximity between the icon menu 30 and cursor selection position 25 should be provided as will be described in greater detail below in regard to FIG. 6.

Assuming sufficient vertical proximity (e.g. d=8 arbitrary units, such as character rows, or less) between cursor 20 (or location 25) and an icon address to indicate by that combination that the user may wish to make a selection from the icon menu, the horizontal address of the cursor location 25 is compared to horizontal addresses of each of the icons 35 in icon menu 30 to identify the icon with the closest address to that of the cursor. The display of the nearest icon can then be increased in size in a manner well-understood in the art in accordance with any of a number of known techniques such as sprites, objects, overlays, z-buffers and the like; the choice and specific implementation of which is unimportant to the practice of the invention. In accordance with the proximity d, a degree of expansion of the icon is specified, preferably in some linear or non-linear inverse proportionate relationship to the proximity of the graphic cursor and the icon rendered in expanded form. For example, some arbitrary number such as sixteen could be divided by d and the integer portion of the result used to specify how many times each raster line of the original icon image is repeated to render the enlarged icon. In such a simple case, truncation of d and/or the result of division provides a sufficient degree of size stability to the enlarged icon. This process is preferably repeated for each frame or each small plurality of sequential frames of the display.

Figure 2:
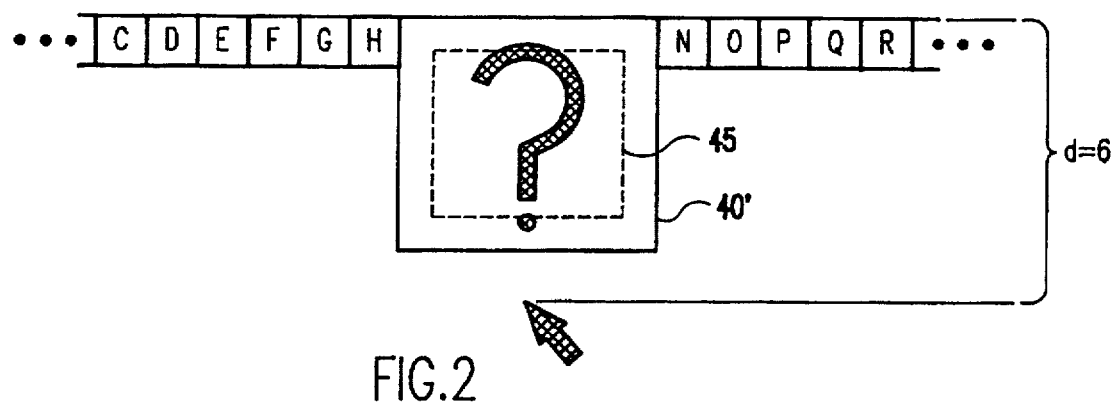

Thus, as shown in FIG. 2, when the proximity between icon address and graphic cursor address is reduced to d=6, icon 40 and graphic imagery within it is rendered at a yet larger size as shown at 40'. Selection zone 45 within the icon is also expanded accordingly as can be readily accomplished by appropriate scaling of position comparison boundaries.

Figure 3A:
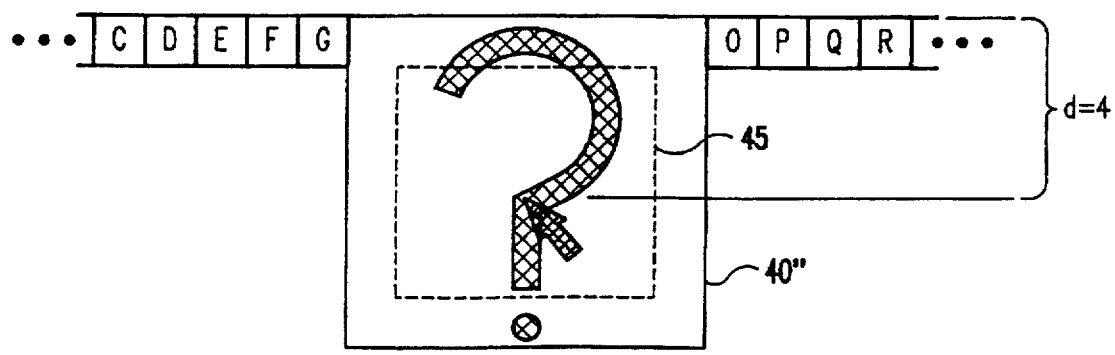
Figure 3B:
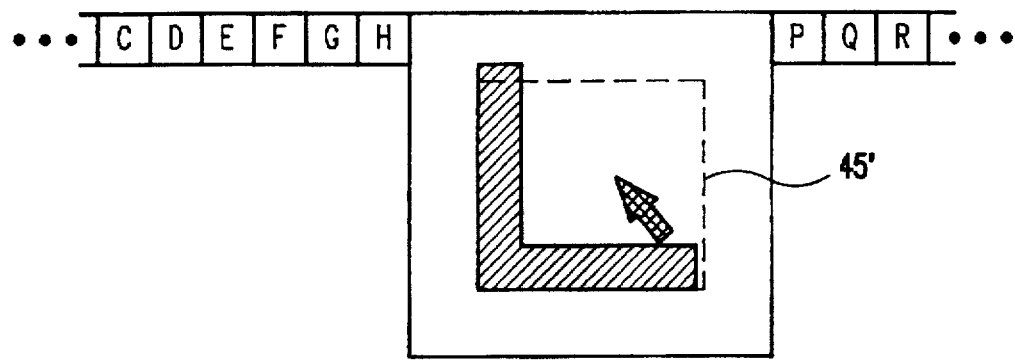

Further motion of the graphic cursor toward the icon until d=4 causes redisplay of the icon and its imagery at a further expanded size as shown at 40". The selection zone 45 is also further expanded and, in FIG. 3A, has actually captured the graphics cursor position. No further movement of the graphics cursor toward the top of the screen is necessary for selection but further expansion of the icon as a visual aid can be readily accomplished by such further motion. Whether or not such further expansion is desired or required by the user, at the degree of expansion shown at any of FIGS. 1-3A, horizontal motion of the cursor may be sufficient to change identification of the icon selected, as shown in FIG. 3B. It should be noted that the icon address is not changed and resolution for selection based on closest proximity remains the width allotted to each unexpanded icon, in this case, two character spaces. Therefore, horizontal motion of the cursor, preferably at low speed, in any of the screens or windows of FIGS. 1-3A will cause a sequence of expanded icons to be displayed at slightly differing positions corresponding to the original address of each icon.

Thus, any degree of expansion of icon images is readily available to the user as an adjustable visual aid. Further, expansion of the selection zone 45 with the icon images provides positional stability during selection achieving the same purpose as the "gravity well" but without adverse effect on the linearity and controllability of graphic cursor motion. There is no conflict between the horizontal extent of the selection zone 45 of a particular icon and the positional resolution for determining the nearest icon for such expansion since the onset of selection can be determined and the intended icon location restored to any point in its dynamic motion history, much in the manner that cursor motion during selection can be canceled, as disclosed in the above-incorporated copending application.

Figure 4:
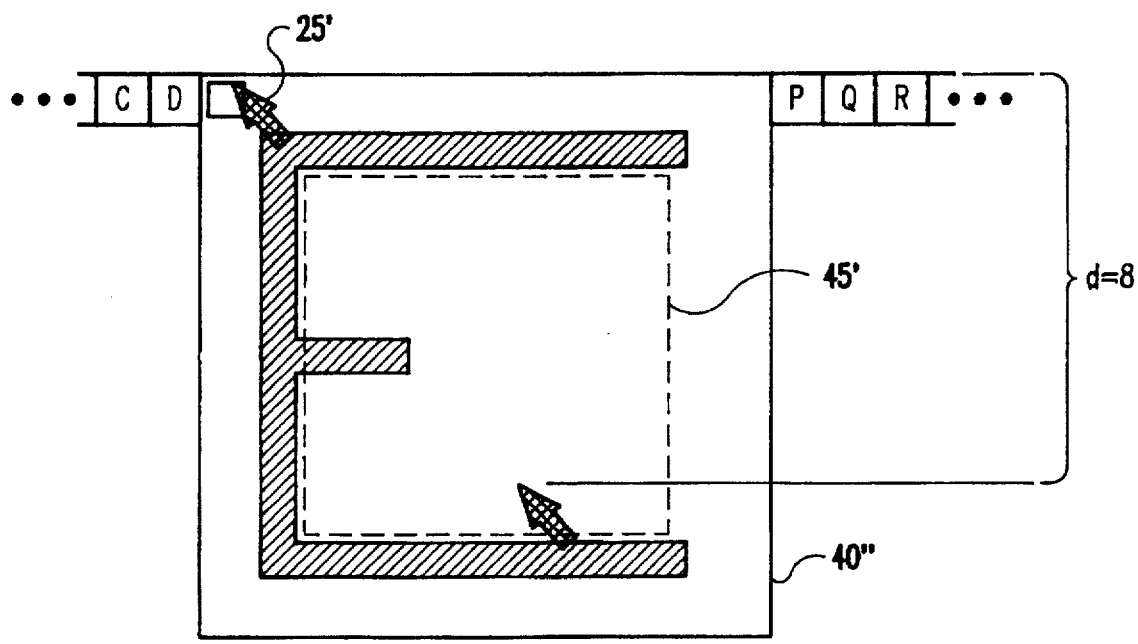
FIGS. 4 and 5 are a sequence of alternative displays corresponding to a requirement for mandatory input in an application in accordance with a feature of the invention.

Referring now to FIG. 4, a variation of the display of the invention is shown when a mandatory control or other command or user action such as a print or retry command must be exercised at some point in an application program currently running (e.g. active in a foreground window). Since the command is mandatory, it is considered desirable to expand the icon sufficiently to capture the cursor (as occurred due to cursor proximity in FIG. 3A) as can easily be accomplished in numerous ways. For example, if the technique alluded to above for expansion of the icon by dividing an arbitrary number by d is employed, the arbitrary number can be iteratively increased by repetitively adding it to itself and testing the icon selection zone against the cursor position on each iteration. Alternatively, the icon can be expanded to an arbitrary size and the graphic cursor brought to the selection position.

If the cursor is captured in one of these ways or any other fashion, the operator need only perform selection to authorize the function. However, in the former case, since the position of the cursor is not known in advance, it is considered desirable to incrementally expand the icon, possibly repeatedly, to a point where the selection zone of the icon includes the cursor position. Repeating the expansion simplifies the repetitive testing for capture and also provides for possibly shrinking the icon, as will be described below. Repetitive expansion of the icon and the animation of the displayed image is highly effective for attracting the attention of the operator.

It is also considered preferable to be able to at least repetitively test the selection zone of the icon against the cursor position so that the icon need only be as large as necessary to capture the cursor position. If this is done, the user can not only further enlarge the icon at will but also shrink the icon by moving the cursor toward the normal position of the icon in the unexpanded icon menu to reveal any part of the screen which may be concealed by the expanded icon. Also, since it is usual to provide an option of avoiding authorization of the mandatory command, such a possibility is readily accomplished by simply not providing for the icon to be shrunk below its unexpanded size. In this case, the icon selection zone location within the icon will provide a margin in which selection of the operation will not occur, as shown, for example, if the cursor were to be moved to location 25', as shown in FIG. 4, at the upper edge of the screen. Positioning is not critical since the cursor location will be at the limit of cursor movement or, alternatively, outside the display window altogether.

If more than one command may be chosen in response to the state of an application but fewer than all commands represented by the icon menu are appropriate, it is not appropriate to capture the cursor with any particular icon. However, the available options may be communicated to the user by expanding less than all of the icons in the menu, as shown, for example, in FIG. 5. This can be readily accomplished, for example, by providing for application control over whatever means is used for selection, overriding proximity as the criterion for expansion, deselection of all unavailable options as candidates for expansion and expanding the remainder to a predetermined degree, such as by performing a single addition of the arbitrary size number to itself before dividing by d in the simple example given above.

Figure 5:
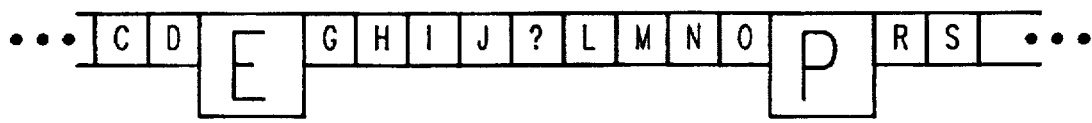

In the variation of the display given in FIG. 5 and discussed above, the icons remaining after deselection may be considered as a sparse array of icons which may be provided by the application in normal operation (e.g. even if deselection of some icons is not performed by the application). In such a case, and others as well, another variation of visual enhancement of the icons may be desired as will now be explained in connection with FIG. 6.

Specifically, if the icons E and P are at arbitrary locations on the screen 61, 62 and the cursor at another arbitrary location, evaluation of d' and d" would ordinarily be done in regard to both orthogonal directions on the display by, for example, applying the well-known Pythagorean theorem to the distances between the icon address and the cursor address in both coordinate directions. As before, differences in d provide for different degrees of expansion of respective icons. However, at any arbitrary size of the respective icons, the relative difference in addresses in each coordinate direction may be used to produce skew by advancing or delaying the rendering of each raster line of each icon image in dependence on the sign of the positional difference and the amount of the delay corresponding to respective values of d' and d".

Thus each icon will be distorted and appear to reach out for the cursor as depicted at 63. If the skew is produced non-linearly, an amorphous, "amoeba-like" curved appearance to the outline of the icon can be achieved. In either case, the visual distortion of the shape of the icon as well as the distortion of the graphic image therein is believed to be extremely effective in attracting the user's attention. As with other visual enhancements described above, the selection zone is also expanded and selection facilitated without the need for introducing non-linearities of cursor movement, such as are caused in the so-called gravity-well stabilization scheme described above. Additionally, visual enhancement of the icon image as well as effective attention-attracting attributes are provided.

Many equivalent ways of producing the above visual effects will be apparent to those skilled in the art in light of the above-described function and operation of the invention.

It is also to be understood that other display attributes such as expansion of an icon in whole or in part with an image shaped similarly to a drop-shadow can be provided in a similar fashion (e.g. controlled in a generally inverse relation to proximity to the cursor) in addition to or in substitution for size and skew. However, inclusion of size change in generally inverse proportion to proximity is preferred since it provides a user-controllable vision aid. Likewise, skew is preferred since the distortion is effective in attracting the attention of a user.

To aid in a visualization and a full understanding of the invention, however, an exemplary block diagram of suitable apparatus for producing the above-described effects will now be discussed. It is to be understood from the following discussion that the invention can be implemented in either hardware or software emulating the same on special purpose or general purpose processors; the latter being preferred for ease of implementation with a wide variety of applications. A combination of hardware and software such as the use of a math or display co-processor will usually provide increased speed of response. Further, it is to be understood that the following discussion is of an exemplary arrangement and that other equivalent arrangements or portions thereof could be employed within the spirit and scope of the invention.

Figure 7:
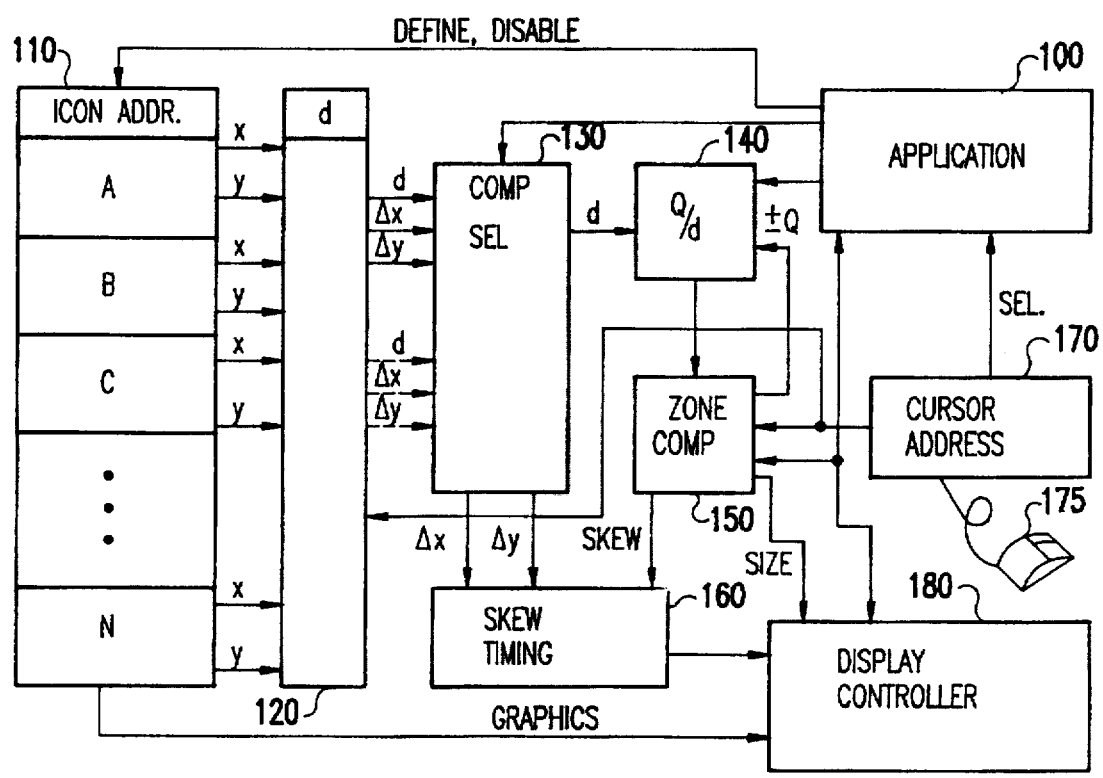
FIG. 7 is a schematic diagram of the architecture of a preferred embodiment of the invention.

Referring now to FIG. 7, an application 100 defines the addresses and graphics corresponding to a plurality of icons or menu items and stores the same in registers 110. As the display is generated, the graphics of each icon are selectively provided to the display controller 180 and the address of each icon is provided to a digital subtractor circuit 120 which also receives an address of the graphics (or text) cursor (determined by graphics input device 175) from register 180 and evaluates proximity d of each icon. Thresholding may also be performed on d at the subtractor 120 to limit the number of comparisons of d which must be made. For example, if the icon menu is provided in a row (or column) as in FIGS. 1–3B, only a maximum of two distances must be considered which may be chosen in accordance with the horizontal (or vertical) display address of the cursor. A threshold may also be used to disable the remainder of the invention when the graphics cursor is remote from the menu or any icon. Comparison may also be simplified by only evaluating either $\Delta x$ or $\Delta y$ as d when the menu is arranged in a row or column.

Comparator/selector 130 selects the icon image or small plurality of icon images having the smallest value of d or as specified by the application for prompting for a mandatory input and provides the corresponding value(s) of d to divider circuit 140 which divides an arbitrary number Q by each value of d to determine a size factor at which the icon is to be rendered. It should be noted that the address of the icon does not change but the display addresses at which it is rendered on the screen will change with the size of the icon. It should also be noted that the size factor can be limited by the application such as for limiting size expansion to prevent unintended selection or the use of skew for visual enhancement as described in connection with FIG. 6 or delimiting size expansion in the case of a requirement for mandatory input.

The coordinates of the limits of the icon and the selection zone at any particular size are provided to selection zone comparator 150 which also receives a cursor address and a control signal from the application to determine whether or not a mandatory input is required. If a mandatory input is required and the cursor coordinates do not fall within the selection zone of the icon, the zone comparator adjusts Q in divider 140 to further expand the icon and the selection zone. If not, Q is not adjusted but set at an arbitrary value.

In either case, if zone comparator finds the cursor address to be within the selection zone, Q is not further incremented. As noted above, Q can be reset to an arbitrary value periodically or at will and again incremented until the cursor is captured in order for the icon size to be controlled (e.g. increased or decreased) by cursor movement in a simple and visually enhanced manner through cursor movement. Successful capture of the cursor or determination that the cursor is within the selection zone may also be reported to the display controller which may provide some attribute for enhancing the cursor display upon selection capability being achieved.

The selection zone comparator preferably also provides a control signal to skew timing element 160 which also receives Δx and Δy signals from comparator/select circuit 130. This is considered preferable since it is considered undesirable to perform distortion of the icon beyond the point at which the selection zone reaches the cursor. Further, d, which regulates the amount of skew provided (when increase of size is limited) will generally be implicit in the size factor and the amount of skew provided for each icon will be determined in accordance with that value. Therefore, the zone comparator is a convenient location at which these functions may be combined. Non-linearities of skew timing, mentioned above, may be introduced at will in the skew timing element, independently of any other process or operation within the general architecture of the invention.

The size factor, the skew timing of the icon graphics (or legends, in the case of alphanumeric menu items) and the icon addresses are thus derived and provided to the display controller 180 which renders the icons in a visually enhanced manner on the display. Depending on the enhancement mode determined by the operational state of the application, any and all of the variations of display enhancement described above may be selectively produced.

In view of the foregoing, it is seen that the invention, as described above, can be easily and naturally used to provide visual enhancement of several sorts including increase of ease of recognition of small icons which may be enlarged to attract the attention of the operator in several different ways. The area of the display or window can thus be limited, even for a large number of icons, and effective stabilization of cursor position during selection can be provided without alteration of linearity of response to a graphic input device. Mandatory inputs can be signalled in an obvious manner while obscuring of important areas of the screen display can be easily avoided by the operator without complex automatic screen image evaluation.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A method for enhancing a visual feature of a display of a menu item in an inverse relation to a distance between the menu item and a cursor image, including the steps of:

establishing a location of said menu item on a display;
   detecting a location of the cursor image on the display;
   detecting a distance between said location of said menu item and said location of said cursor image;
   assigning a value to an attribute data representing said visual feature, said assigned value being from a group of at least three different values, said assigned value being in a generally inverse relation to said detected distance;
   displaying a menu item in accordance with said attribute data value assigned by said assigning step, so that the visual feature of the displayed menu item corresponding to said attribute is displayed in a manner selected from a group of at least three manners, each of said at least three manners corresponding to one of said group of at least three different values.

2. A method as recited in claim 1, wherein said attribute includes size.

3. A method as recited in claim 1, wherein said attribute includes skew.

4. A method as recited in claim 2, wherein said attribute includes skew.

5. A method as recited in claim 2, including the further step of detecting presence of said cursor location within a selection zone of said menu item.

6. A method as recited in claim 5, including the further step of limiting size of said menu item in response to said step of detection of said cursor location within said detection zone of said menu item.

7. A method as recited in claim 6, wherein said detecting and limiting steps are repeated.

8. A method as recited in claim 1, including the further steps of comparing distance of at least two menu items to said location of said cursor, and
   performing said displaying step only on a menu item determined to be closest to said cursor image by said comparing step.

9. A method as recited in claim 1, including the further steps of comparing distance of at least two menu items to said location of said cursor, and
   performing said displaying step only on menu items determined to be closer to said cursor image by said comparing step than a threshold distance.

10. A method as recited in claim 1, including the further step of altering said cursor image location,
    repeating said step of determining distance between said location of said at least one of said menu items and said location of said cursor image, and
    displaying another menu item in accordance with an attribute determined in generally inverse relation to said distance determined by said determining step.

11. A method as recited in claim 10, wherein said altering step is performed in response to a graphic input device.

12. A method as recited in claim 11, wherein said graphic input device is a mouse.

13. A method as recited in claim 10, including the further steps of comparing distance of at least two menu items to said location of said cursor, and
    performing said displaying step only on a menu item determined to be closest to said cursor image by said comparing step.

14. A method as recited in claim 10, including the further steps of comparing distance of at least two menu items to said location of said cursor, and performing said displaying step only on menu items determined to be closer to said cursor image by said comparing step than a threshold distance.

15. A method as recited in claim 1, including the further steps of detecting a cursor location within a selection zone of a menu item, and controlling selection of said menu item.

16. A method as recited in claim 1, including the further step of altering a selection zone of said at least one menu item in generally inverse proportion to said distance determined in said determining step.

17. A method as recited in claim 16, including the further steps of detecting a cursor location within said selection zone of a menu item, and controlling selection of said menu item.

* * * * *